United States Patent [19]

Althuber et al.

[11] 3,925,817

[45] Dec. 9, 1975

[54] OPTICAL DRIVE CONTROL WITH HEAD MOUNTED LIGHT GUIDE MEANS

[75] Inventors: Horst Althuber; Karl Rupp, both of Vienna, Austria

[73] Assignee: U.S. Philips Corporation, New York, N.Y.

[22] Filed: Apr. 24, 1974

[21] Appl. No.: 463,675

[30] Foreign Application Priority Data

May 3, 1973 Austria .............................. 3893/73

[52] U.S. Cl. ...................... 360/74; 360/62; 360/122

[51] Int. Cl.$^2$ G11B 15/22; G11B 15/08; G11B 5/22

[58] Field of Search .......... 360/74, 122, 137, 62, 69

[56] References Cited

UNITED STATES PATENTS 3,614,453 10/1971 Johnson ................................ 360/74

*Primary Examiner*—Daryl W. Cook

*Assistant Examiner*—R. S. Tupper

*Attorney, Agent, or Firm*—Frank R. Trifari; Simon L. Cohen

[57] ABSTRACT

Recording and/or playback apparatus frequently is provided with a photoelectric device for switching functions, in particular for stopping and reversing the system for driving the record carrier, which device is controlled by means of transparent parts of a record carrier. A magnetic head arranged near the path along which the record carrier travels includes at least part of a light guide which optically connects a limited area of the peripheral surface of the head wrapped round by the record carrier to a photosensitive element of the photoelectric device.

4 Claims, 4 Drawing Figures

OPTICAL DRIVE CONTROL WITH HEAD MOUNTED LIGHT GUIDE MEANS

Figure 1:
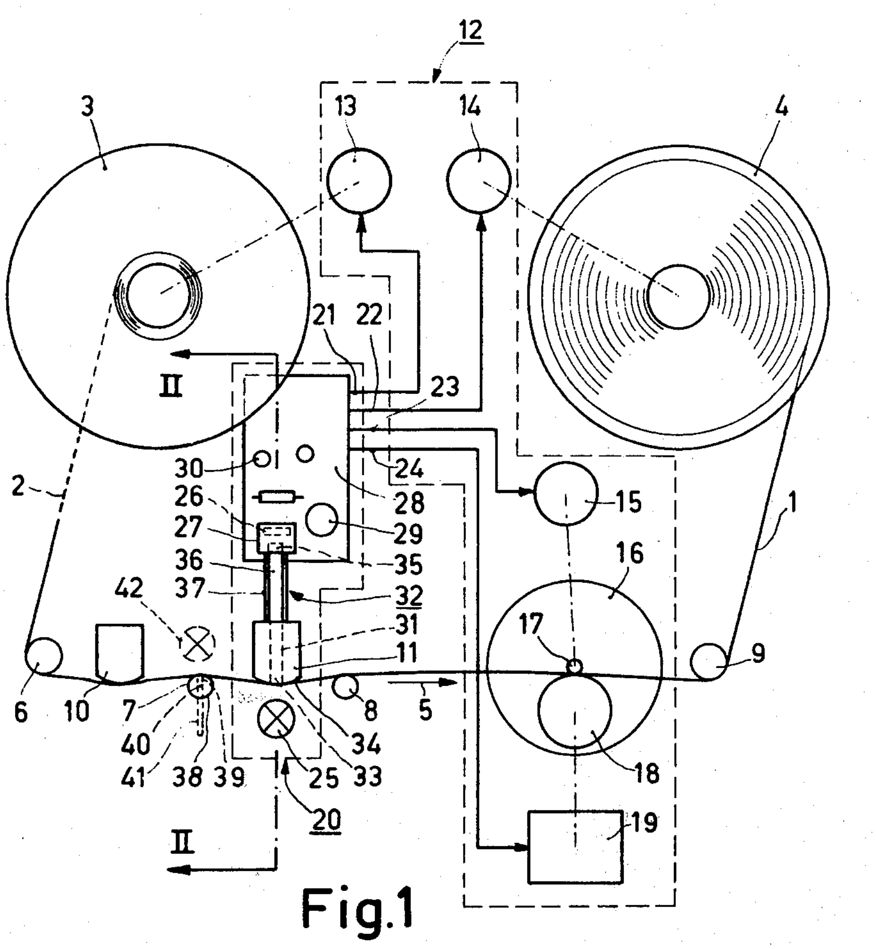

The invention relates to a recording and/or playback apparatus provided with a photoelectric device for switching functions of the apparatus, in particular for stopping or reversing the system for driving the record carrier. The device is controlled by means of transparent parts of a record carrier which preferably is accommodated in a cassette.

German Pat. No. 1,254,377 describes a recording and/or playback apparatus of the above kind. The described apparatus has a photosensitive element mounted near the record carrier for detecting light which is radiated by a source of light and is transmitted by a transparent part of the record carrier. The photosensitive element is located near the magnetic heads and record carrier guide members and occupies a certain amount of the limited space in an apparatus employing a record carrier accommodated in a cassette. Furthermore in the known apparatus the photosensitive element is likely to be influenced by unwanted extraneous light, because it is accessible to ambient light.

It is an object of the present invention to avoid these undesirable features in a simple manner. For this purpose, according to the invention in a recording and/or playback apparatus of the kind described a magnetic head located along the path of the record carrier and at least partly wrapped around thereby accommodates a section of a light guide which optically connects a limited area of the peripheral surface of this head abutting the record carrier and a photosensitive element to a photosensitive element of a photoelectric device mounted in a portion of the apparatus shielded from ambient light.

This advantageously ensures that in the area of the magnetic heads and the means for guiding and driving the record carrier no additional photosensitive element need be located. This provides a saving in space that is particularly important in a cassette apparatus. The use of a light guide further enables the photosensitive element to be mounted more or less remotely from the record carrier, for example, on a printed circuit board in the apparatus. A further advantage of the recording and/or playback apparatus according to the invention is that the record carrier completely covers the limited area of the peripheral surface of the magnetic head. Thus any disturbing influence of extraneous light is substantially precluded. In an apparatus according to the invention a special light source for influencing the photosensitive element and hence the photoelectric device may even be dispensed with by using the ambient light. In addition, complete covering of the limited area of the peripheral surface of the magnetic head which is optically connected to the photosensitive element by the light guide results in a particularly marked increase of the luminous flux which influences the photosensitive element at the transition to a transparent part of the record carrier.

According to another aspect of the invention the light guide is located in an erase head. With a view to compact construction of the light guide and the photosensitive element these components are advantageously accommodated in the magnetic head so as to be protected from light, resulting a unit which comprises in addition to the magnet system, the light guide and the photosensitive element of the photoelectric device. Thus the likelihood of mechanical damage, in particular of the light guide, is substantially reduced.

Figure 2:
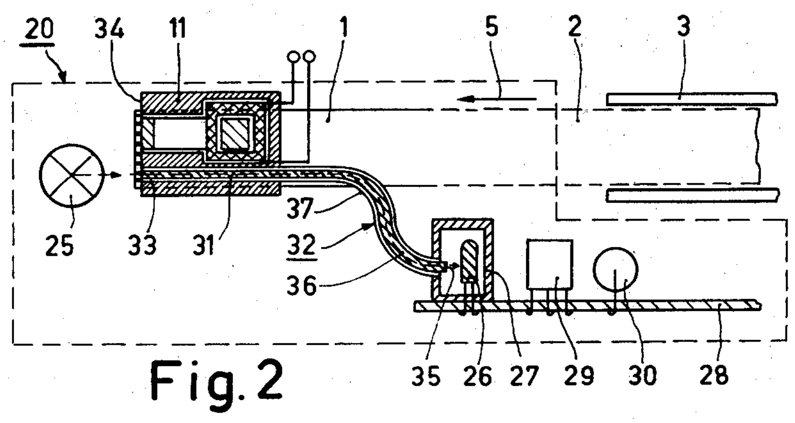
Figure 3:
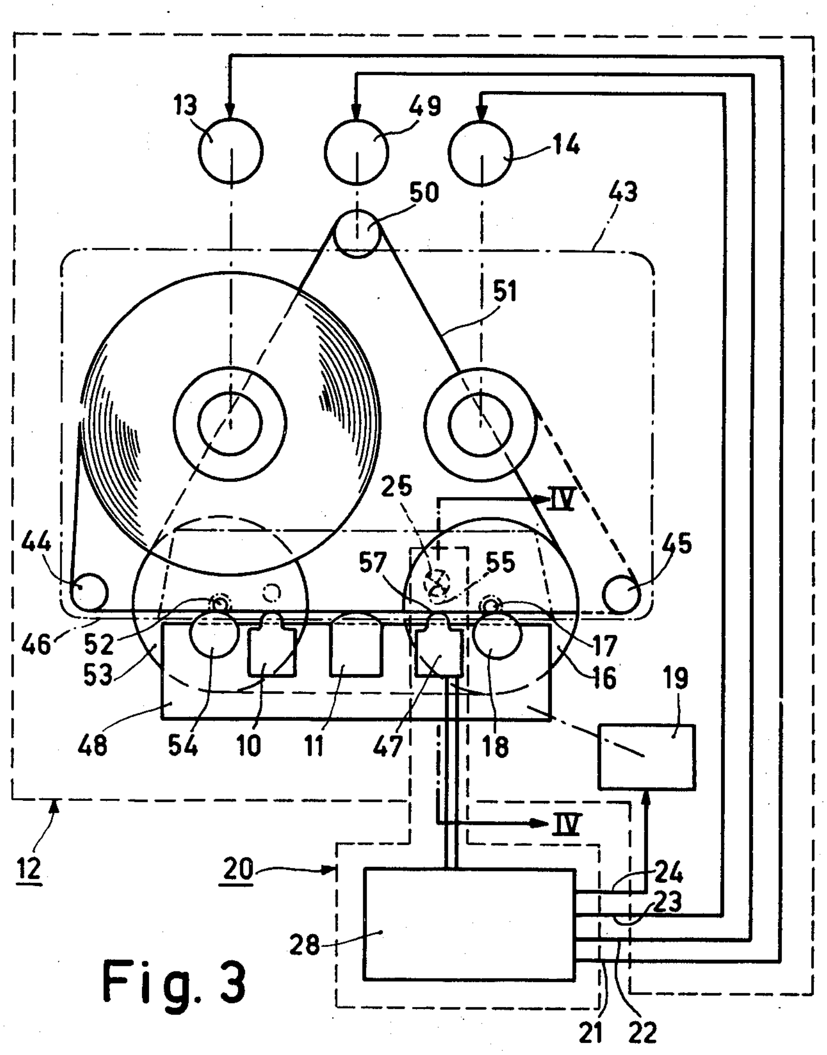
Figure 4:
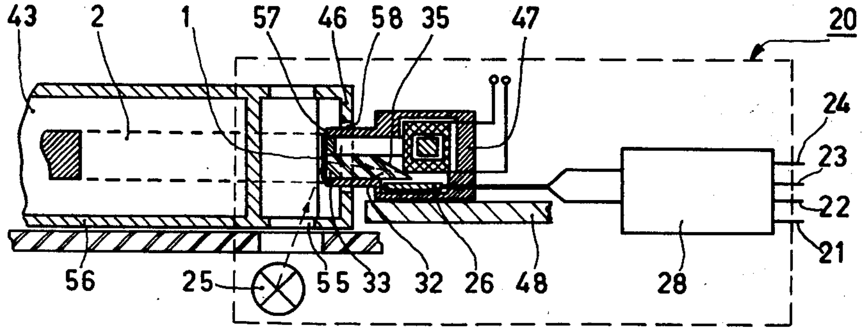

Embodiments of the invention will now be described, by way of example, with reference to the accompanying diagrammatic drawings, in which:

FIG. 1 shows a first embodiment of a recording and/or playback apparatus in which the light guide is located in a record and/or playback head, FIG. 2 is a sectional view on an enlarged scale of a detail of the apparatus of FIG. 1 taken on the line II—II thereof, FIG. 3 shows a second embodiment of the apparatus in which both the light guide and the photosensitive element are accommodated in an erase head, and FIG. 4 is a sectional view to an enlarged scale of a detail of the apparatus of FIG. 3 taken on the line IV—IV thereof.

In the recording and/or playback apparatus shown in FIGS. 1 and 2 a record carrier 1 which has transparent parts 2 at given locations for recording and/or playing back and erasing information, for example data, audio signals, video signals and the like, moves from a supply reel 3 to a take-up reel 4 in the direction indicated by an arrow 5. The system for guiding the record carrier 1 between the reels 3 and 4 comprises a first guide roller 6, two guiding elements 7 and 8 and a second guide roller 9. An erase head 10 is positioned between the guide roller 6 and the guiding element 7. A record and/or playback head 11 is located between the guiding elements 7 and 8. The two heads 10 and 11 are connected to the electric part of the apparatus in known manner.

The apparatus has a system 12 for moving the record carrier 1 which comprises two motors 13 and 14, which are coupled to the reels 3 and 4 respectively for example by a transmission, and a motor 15 that drives a capstan 17 located between the guiding element 8 and the second guide roller 9, and is provided with a flywheel 16. The driving system 12 further comprises a pressure roller 18 that is pressed against the capstan 17 or the record carrier 1 by an electromagnetic device 19 in response to an electrical signal.

When starting the apparatus the record carrier 1 is manually threaded in the apparatus in the manner shown in FIG. 1, after which the driving system 12 is actuated in a manner not shown, a supply voltage being applied to the motors 13, 14 and 15, if required via a speed regulator. The pressure roller 18 presses the record carrier 1 against the capstan 17 when actuated by the electromagnetic device 19. As a result the record carrier 1 is moved in the direction indicated by the arrow 5. During this movement an existing recording can be played back or erased, or new information can be recorded. The apparatus may be designed so that the record carrier can be moved at an increased speed for rapid searching for a given passage on the record carrier or for rewinding.

Stopping the driving system 12 by means of the transparent parts 2 of the record carrier 1 is effected by a photoelectric device 20 which has control outputs 21, 22, 23 and 24, through which the motors 13, 14 and 15 and the electromagnetic device 19 respectively can be switched off in a manner not shown in detail.

The photoelectric device 20 comprises a source of light 25, which may take the form of a small electric filament lamp, and a photosensitive element 26, for example a photodiode, a phototransistor or a photoresistor, for detecting the light emitted by the source 25 and transmitted by a transparent part 2 of the record carrier 1. The photosensitive element 26 is accommodated in an opaque housing 27 so as to be protected from ambient light and is secured to a printed circuit board 28 which also carries further electronic elements 29 and 30 of the photoelectric device 20.

In the record and/or playback head 11 a part 31 of a light guide 32 is provided, one end 33 of which lies in the guide surface 34 of the record and/or playback head 11 along which the record carrier 1 moves. The other end 35 projects into the light-tight housing 27 containing the photosensitive element 26. The part 36 of the light guide 32 outside the head 11 is enclosed by an opaque sheath 37.

In operation the record carrier 1 when moving past the guide surface 34 of the record and/or playback head 11 is illuminated by the light source 25 of the photo-electric device 20. As long as the opaque part of the record carrier 1 moves over the guide surface 34, the optical connection between the light source 25 and the end 33 of the light guide 32 lying in the guide surface 34 is broken, so that the photo-electric device 20 does not influence the driving system 12. When, however, a transparent part 2 of the record carrier 1 moves over the guide surface 34 of the head 11 the light emitted by the source 25 will strike the end 33 of the part 31 of the light guide 32 which lies in the guide surface 34 and will be conducted by the guide 32 to the photosensitive element 26. As a result the photosensitive element 26, and consequently the photo-electric device 20, will be influenced, so that through the outputs 21, 22, 23 and 24 the motors 13, 14, 15 and the electromagnetic device 19 for pressing the pressure roller 18 against the record carrier 1 and the capstan 17 will be switched off. This ensures that the driving system 12 of the apparatus is automatically stopped when a transparent part 2 of the record carrier 1 reaches the record and/or playback head 11.

The above-described arrangement is extremely efficient because under normal operating conditions the opaque part of the record carrier completely screens the light guide and located in the guide surface of the record and/or playback head, thus shielding the photosensitive element from any disturbance by extraneous light. Furthermore a transition from an opaque part to a transparent part of the record carrier results in a marked increase in the luminous flux which strikes the photosensitive element. Also, in the record and/or playback head a small amount of space only is required for the light guide, and the photosensitive element can be remote from the record carrier and the light source. This enables the photosensitive element to be mounted on a printed circuit board that carries the electric part of the photoelectric device.

Another embodiment of the optical part of a photoelectric device is schematically shown in broken lines in FIG. 1. In this embodiment the guiding member 7 is formed with a duct 39 which terminates in that area of the peripheral surface 38 of the member 7 which is in contact with the record carrier 1, a part 40 of a light guide 41 being contained in this duct so as to extend to this area. A light source 42 is mounted opposite this area.

The recording and/or playback apparatus shown in FIGS. 3 and 4 is of the type in which recording and/or playing back and erasing can be effected in both directions of movement of the record carrier. In this apparatus a record carrier 1, which at both ends has a transparent part 2, is accommodated in a cassette 43 indicated by a dot dash line in FIG. 3. The record carrier 1 is guided past an apertured narrow face 46 of the cassette 43 by two guide rollers mounted in the cassette. The apparatus has a record and/or playback head 11 and two erase heads 10 and 47. The heads 10, 11 and 47 are mounted on a head support 48 arranged to be moved towards and away from the narrow face 46 of the cassette.

The driving system 12 of the apparatus comprises an electromagnetic device 19, two motors 13 and 14 for driving two turntables and a reversible motor 49. The motor 49 is mechanically coupled with an intermediate wheel 50 which by means of a belt 51 drives two flywheels 16 and 53 connected to capstans 17 and 52 respectively. The electromagnetic device 19 is coupled with the head support 48 for shifting the latter, thereby moving two pressure roller 18 and 54 so that the record carrier is pressed against the capstans 17 and 52.

When a cassette 43 is placed on the apparatus the driving spindles 17 and 52 penetrate into the cassette and engage the record carrier 1 which moves along the narrow face 46 of the cassette. When the apparatus is switched on the motors 14, 15 and 49 and the electromagnetic device 19 are energized so that the head support 48 is moved towards the cassette 43 and the pressure rollers 18 and 54 are pressed against the capstans 17 and 52 respectively and against the record carrier 1, which then is moved in the direction selected. The record and/or playback head 11 and the erase heads 10 and 47 then are in active contact with the record carrier 1 so that information, for example, audio information, can be played back, recorded or erased.

In this apparatus the photoelectric device 20 automatically switches the driving system 12. Depending upon the transparent parts 2 provided at the ends of the record carrier 1 the direction of movement of the record carrier can automatically be reversed. This enables all the tracks on the record carrier 1 to be consecutively scanned.

The light source 25 of the photoelectric device 20 is located beneath an aperture 55 in a principal face 56 of the cassette 43 so that the light emitted by the source enters the cassette and in the area of a guide face 57 of the erase head 47 illuminates the record carrier 1. As an alternative, the light may be introduced into the cassette from a more remote light source by means of another light guide.

In this embodiment the light guide 32 and the photosensitive element 26 are accommodated so as to be screened from light in the second erase head 47 in which the part nearer the guide face 57 for the record carrier 1 is tapered from the part more remote from this guide face 57, to enable it to be brought into active contact with the record carrier 1 through an aperture 58 in the narrow face 46 of the cassette. The end 33 of the light guide 32 is flush with the guide face 57 of the erase head 47. The other end 35 of the light guide 32 is wedge-shaped and coated with a reflecting layer, for example a vapour-deposited film of aluminium, so that light striking the end 35 is reflected to the photosensitive element 26. The photosensitive element 26 is electrically connected to the remaining part of the photoelectric device 20, which part is mounted on the printed circuit board 28.

As long as the opaque record carrier 1 covers the guide face 57 of the erase head 47, it completely screens the end 33 of the light guide 32 so that the photosensitive element 26 is not influenced. However, whenever one of the transparent parts 2 passes the end 33 of the light guide 32 the latter receives light which is emitted by the source 25, is conducted by the light guide 32 and is reflected to the photosensitive element 26 by the wedge-shaped reflecting end 35. As a result the electric properties of the element are changed and the photoelectric device 20 is influenced so that it switches the driving system 12 through the outputs 21, 22, 23 and 24 in a convertional non-specified manner, reversing the direction of movement of the record carrier 1.

The joint-accommodation of the light guide and the photosensitive element in the erase head provides a unit in which these components of the photoelectric device are screened from light. This provides the advantage of good mechanical protection, in particular for the light guide. Further advantages of this embodiment are the saving in space, the shielding from extraneous light and the simple replaceability.

Obviously many modifications may be made without departing from the scope of the invention. For example, in the embodiment shown in FIG. 3 the two erase heads may each include a light guide and a photosensitive element, so that the same conditions apply to each change-over of the driving system. The photoelectric device may also be used for other functions than those described above, for example for switching between record and playback modes and the like. The transparent parts need not extend across the entire width of the record carrier but may lie in or along one track, in which case a magnetic head may include several light guides. The length of the light guide must match the particular conditions and hence may be very short when the photosensitive element lies immediately behind the peripheral surface of the respective magnetic head along which the record carrier moves.

What is claimed is:

1. A magnetic recording and/or playback apparatus for recording and/or playing back information on magnetic tape, comprising a magnetic recording and/or playback head, a magnetic erase head, at least one of said magnetic heads being provided with a curved surface, said record carrier abutting a substantial area of the curved surface of said one of said magnetic heads, motor means for selectively driving said record carrier past said magnetic heads in the forward and reverse directions, a light source mounted opposite said one of said heads, said record carrier being provided with opaque magnetically recorded areas and transparent control areas, a photosensitive element, a light shield surrounding said photosensitive element, a light guide means in said one of said heads for optically connecting the area of the curved surface of said one of said heads that abuts said record carrier to said photosensitive element through said light shield whereby radiation from said light source is conducted to said photosensitive element when said transparent control portion of said record carrier is interposed between said light guide means and said light source, and drive control means connected to said photosensitive element and to said motor means for selecting the direction of motion of said record medium in response to signals from said photosensitive element.

2. Apparatus as claimed in claim 1, wherein the light guide means is mounted in said erase head.

3. Apparatus as claimed in claim 1, wherein said light guide means is mounted in said recording head.

4. Apparatus as claimed in claim 1, wherein said light guide means, said photosensitive element and said light shield are all accommodated in said one of said magnetic heads.

* * * * *